(12) United States Patent
Rushford

(10) Patent No.: US 6,411,389 B1
(45) Date of Patent: Jun. 25, 2002

(54) OPTICAL MONITOR FOR REAL TIME THICKNESS CHANGE MEASUREMENTS VIA LATERAL-TRANSLATION INDUCED PHASE-STEPPING INTERFEROMETRY

(75) Inventor: Michael C. Rushford, Livermore, CA (US)

(73) Assignee: The Regents of the University of Claifornia, Oakland, CA (US)

( * ) Notice: Subject to any disclaimer, the term of this patent is extended or adjusted under 35 U.S.C. 154(b) by 0 days.

(21) Appl. No.: 09/564,073

(22) Filed: May 3, 2000

(51) Int. Cl.[7] .................................................. G01B 9/02
(52) U.S. Cl. ........................................ 356/492; 356/520
(58) Field of Search ................................. 356/492, 496, 356/520; 359/371

(56) References Cited

U.S. PATENT DOCUMENTS 2,924,142 A * 2/1960 Nomarski .................... 359/371
3,495,890 A * 2/1970 Pluta ........................... 359/371
5,898,500 A * 4/1999 Canteloup et al. .......... 356/492

* cited by examiner

Primary Examiner—Samuel A. Turner
(74) Attorney, Agent, or Firm—James S. Tak; Alan H. Thompson

(57) ABSTRACT

An optical monitoring instrument monitors etch depth and etch rate for controlling a wet-etching process. The instrument provides means for viewing through the back side of a thick optic onto a nearly index-matched interface. Optical baffling and the application of a photoresist mask minimize spurious reflections to allow for monitoring with extremely weak signals. A Wollaston prism enables linear translation for phase stepping.

20 Claims, 4 Drawing Sheets

OPTICAL MONITOR FOR REAL TIME THICKNESS CHANGE MEASUREMENTS VIA LATERAL-TRANSLATION INDUCED PHASE-STEPPING INTERFEROMETRY

The United States Government has rights in this invention pursuant to Contract No. W-7405-ENG48 between the United States Department of Energy and the University of California for the operation of Lawrence Livermore National Laboratory.

BACKGROUND OF THE INVENTION

1. Field of the Invention

The present invention relates to interference in polarized light and to etching of optics and more specifically, it relates to the use of polarized light interference for real time measurements of thickness changes in optics being etched.

2. Description of Related Art

It is desirable to improve on the accuracy of techniques for etching structures into SiO2 to a desired depth by monitoring the etch depth in real time. It has been observed that the SiO2 etch rate in Buffered HF vary from 14 to 17 nm per minute. For a 384 nm etch depth, this can become an 82 nm etch depth uncertainty. It is desirable to reduce this uncertainty to less than 10 nm.

Previously, the present inventors have etched to approximately 80% of the desired depth, removed the mask in the region of interest, measured the current etch depth and recalculated an expected end point at the current etch rate. The SiO2 etch was then completed and its depth was measured at a different inspection point, as was done for the 80% point, and then again to confirm the expected etch depth result. This proved to be a time-consuming and labor-intensive process requiring extensive handling of the part. It is desirable to eliminate these steps and etch to a consistent, repeatable endpoint by monitoring the etch depth in real time.

All currently available step height measuring instruments require dry first surface access. It is preferable that a real time monitor be provided that can view the surface being etched from the back side. No instrument maker has done this to date. Also, the reflectivities of the surfaces being etched are not large due to the effective index-matching of water and optical surfaces.

An instrument is desired that will reduced the work required to insure SiO2 etch depths are done accurately to within +/−5 nm, while improving process yield and reducing fluid consumption and the concomitant hazardous waste disposal costs. Slow degradation of the etchant solution as it is consumed is not of consequence if the etch rate is monitored, and thus the etchant remains viable for many cycles and waste disposal costs are significantly lowered.

SUMMARY OF THE INVENTION

It is an object of the present invention to provide an optical monitoring instrument designed to monitor etch depth and etch rate for controlling a wet-etching process.

It is another object of the invention to provide optical monitoring instrument designed to monitor etch depth and etch rate including means for viewing through the back side of a thick optic onto a nearly index-matched interface.

Still another object of the invention provides a method for use of linear translation of a Wollaston prism for phase stepping in a real time optical monitoring instrument.

A phase stepping interferometric microscope, with a Wollaston prism that provides image shearing, monitors etch depths in real time during fabrication of etched structures in optical materials. Linear motion of a Wollaston prism for phase stepping, optical baffling, and proper surface preparation are keys to this instruments success. The interface to monitor is nearly index matched and presents a challenge due to unwanted reflections and scattered light.

This unique optical monitoring instrument is designed to monitor etch depth and etch rate for controlling a wet-etching process. The instrument provides means for viewing through the back side of a thick optic onto a nearly index-matched interface. Optical baffling and the application of a photoresist mask minimize spurious reflections to allow for monitoring with extremely weak signals. Phase unwrapping occurs while etching proceeds to provide a smooth measurement of actual etch depth.

The optical monitor must be useable on a machine that will vibrate and move. To minimize sensitivity to vibrations, a common path monolithic interferometer construction, using the same surface as signal and reference, is chosen as a starting point. The design features of the present invention can be realized with a shearing interferometer. Polarization based interferometers use crystal birefringence to shear the image. The relative intensity between the two images can be adjusted by aligning linear polarizers relative to the optical axis of the crystal.

DETAILED DESCRIPTION OF THE INVENTION

The present invention is a unique optical monitoring instrument designed to monitor etch depth and etch rate for controlling a wet-etching process. The instrument provides means for viewing through the back side of a thick optic onto a nearly index-matched interface. Optical baffling minimize spurious reflections. The application of a photoresist forms a reference reflection surface that balances the reflected intensities between the water-SiO2 interface and the Resist -SiO2 interface. A Wollaston prism enables linear translation for phase stepping. Phase unwrapping occurs while etching proceeds to provide a smooth measurement of actual etch depth.

The optical monitor must be useable on a machine that will vibrate and move. To minimize sensitivity to vibrations, a common path monolithic interferometer construction, using the same surface as signal and reference, is chosen as a starting point. The design features of the present invention can be realized with a shearing interferometer. Polarization based interferometers use crystal birefringence to shear the image. The relative intensity between the two images can be adjusted by aligning linear polarizers relative to the optical axis of the crystal.

Figure 1:
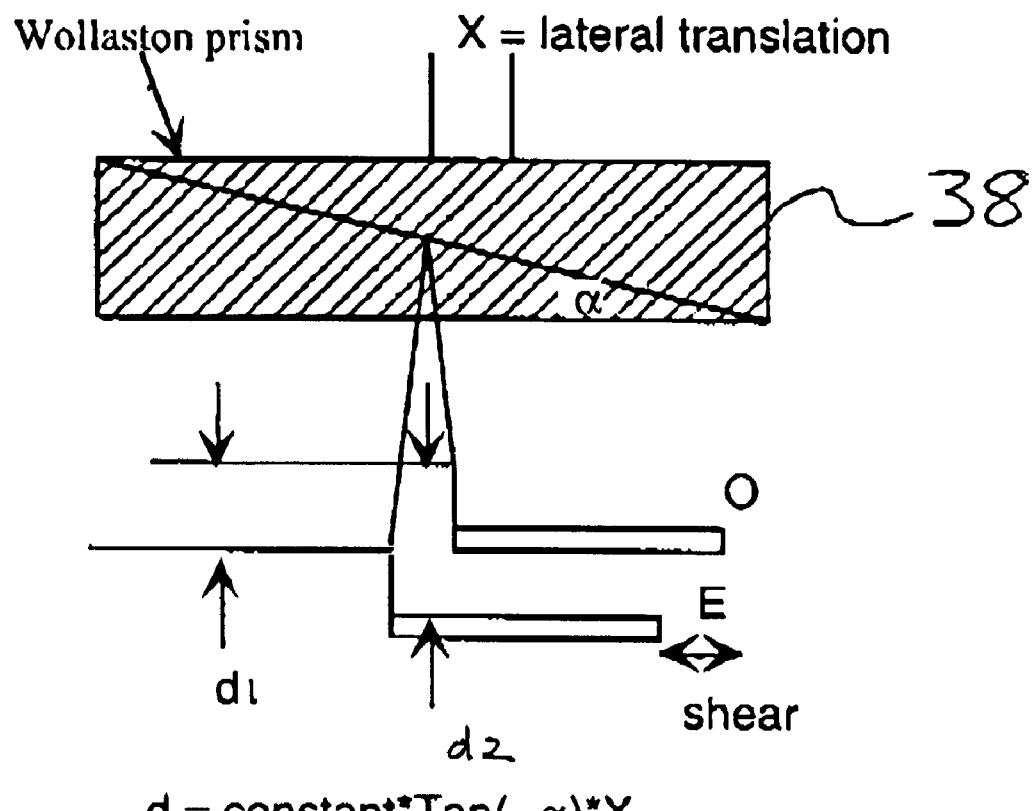
FIG. 1 shows image shear and optical path difference in a Wollaston prism crystal interferometer

The phase between each image can be changed by translation of a Wollaston prism. FIG. 1 shows the nature of the phase delay between orthogonal linear polarizations from a Wollaston prism crystal-based interferometer. In this embodiment, two images of the same surface are compared; one is laterally translated with respect to the other with a different polarization. The image of the surface is in the vicinity of a step between a masked region and an adjacent bare surface exposed to the etchant. In the region of overlap of the sheared images labeled (d1) wave fronts (Ordinary polarization labeled O and Extraordinary polarization labeled E) from like surfaces (bare surface in this case) are compared. In the image region labeled (d2) different surfaces (masked and bare) are compared. This instrument measures the thickness difference between (d1) and (d2) as etching takes place. Generally (d2) and (d1) are the same at the start, so whatever the arbitrary phase difference is between fringes is defined as the zero point.

There is an optical phase shift "mechanical advantage" when phase stepping a crystal interferometer compared to non-common path split beam interferometers. In the case of a Wollaston prism, a linear translation of 50 microns will give an apparent half wave phase shift between its two orthogonal linear polarization wave fronts. A Michelson like interferometer would require very small half-micron movement for a quarter-wave phase shift. The phase shifting accuracy required in the Wollaston prism beam path is about 100 times less demanding than the Michelson like designs.

Figure 2:
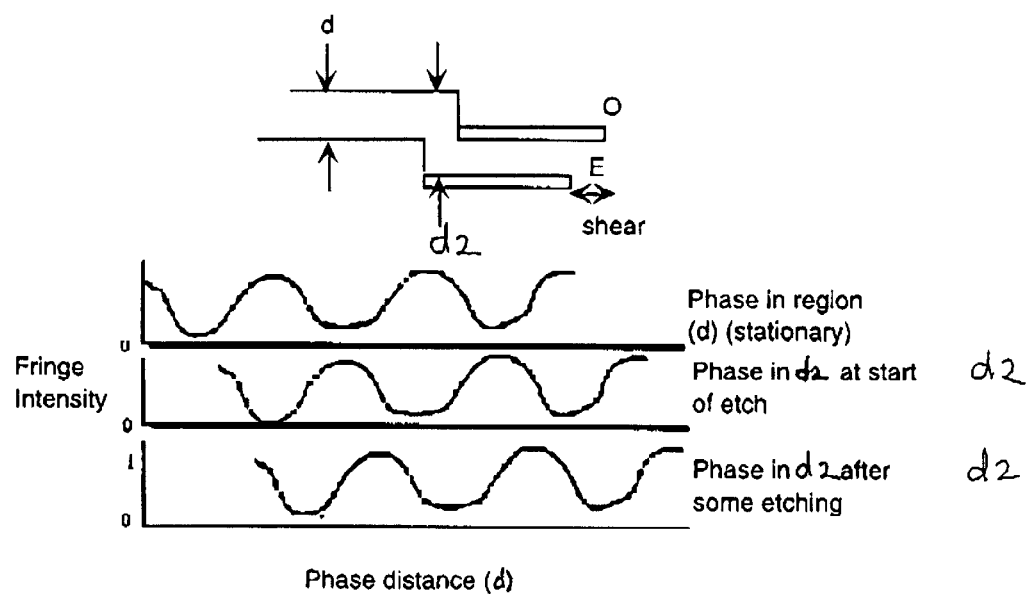
FIG. 2 illustrates that the fringes seen in each region (d1) and (d2) of image overlap are phased differently.

As illustrated in FIG. 2, the fringes seen in each region (d1) and (d2) of image overlap are phased differently. The fringe pattern resulting from (d1) is stationary, while that of (d2) moves as the surface is etched. Monitoring the phase change difference between the two as the etch proceeds is a direct measure of etch depth. Thus, phase measurement in a differential sheared interferometer can be used to measure etch depth. Etch depth is measured by scaling the phase difference between fringes in regions (d1) and (d2). No fringe order confusion occurs because the phase between these regions is a running sum.

Figure 3:
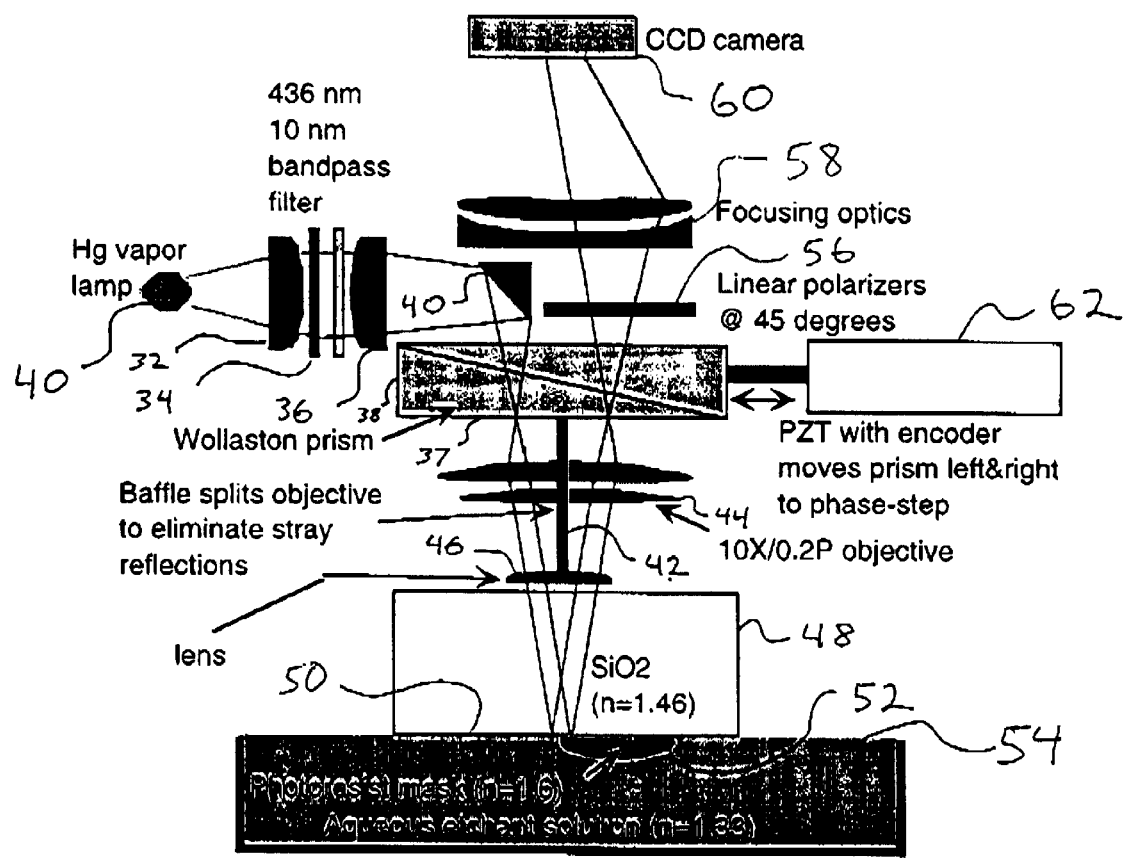
FIG. 3 is schematic of a Nomarski/Weill microscope design modified to be a phase-stepping interferometer of the present invention.

Normarski-Weill proposed a microscope illumination path that has proven useful in an application of the present invention. Its light path offers the least number of scattering surfaces in both the illumination and viewing paths. A schematic of the optical monitor, utilizing the Normarski-Weill microscope illumination path, as it relates to wet-etch monitoring is shown in FIG. 3. In FIG. 3, light from Hg vapor lamp 40 passes through a collimating lens 32, an then propagates through a 436 nm +/−10 nm bandpass filter 34 before being focused by lens 36 onto the exit face 37 of Wollaston prism 38. A mirror 40 is placed in the beam line between lens 36 and Wollaston prism 38. Baffle 42 splits the objective lens 44. The placement of baffle 44 in the objective optics eliminates spurious internal lens reflections that could add to noise in the measured phase shift. The baffle also protrudes from the lens to the back side of the optic being fabricated. In this way the light that reflects from this back side surface can not get into the measurement or detector side of the split objective.

Light from the Hg vapor lamp is focused by lens 46 through the bulk of the SiO2 substrate 48 for reflection from the surface 50 to be etched. The alignment of the light from the Hg lamp is made such that the beams from the Wollaston prism 38 overlap both the photoresist mask 52 and the aqueous etchant solution 54. Light from the overlapped beams pass through the SiO2 substrate 48 and lens 46 to then be focused by objective lens 44, onto surface 37 of Wollaston prism 38. The beams them continue through linear polarizers 56 (which are placed at 45 degrees), through focusing optics 58 and onto CCD camera 60. Wollaston prism 38 is connected to a piezoelectric transducer (PZT) 62 which includes an encoder. PZT 62 moves the Wollaston prism 38 to phase step the light from the Hg vapor lamp.

A design that minimizes scattering is important since a water wetted SiO2 and photo resist coated SiO2 surface reflects very little (0.3%) due to the small index contrasts at these interfaces. The index contrast is balanced for the SiO2-water and SiO2-photoresist interfaces of which monitoring is desired. The reflection light from the SiO2-water and the SiO2-photoresist interface are made equal so to maximize interference fringe visibility. In practice, application of a thick, irregular dot of resist as the mask has proven to substantially eliminate reflections from the resist-water interface by virtue of the steep contact angle formed and the attenuation from absorption of the light in the bulk of the resist. It is very easy to apply this resist dot using an eyedropper. It's done just after a photo resist development and rides along on a hard bake cycle in preparation for HF etching.

Figure 4:
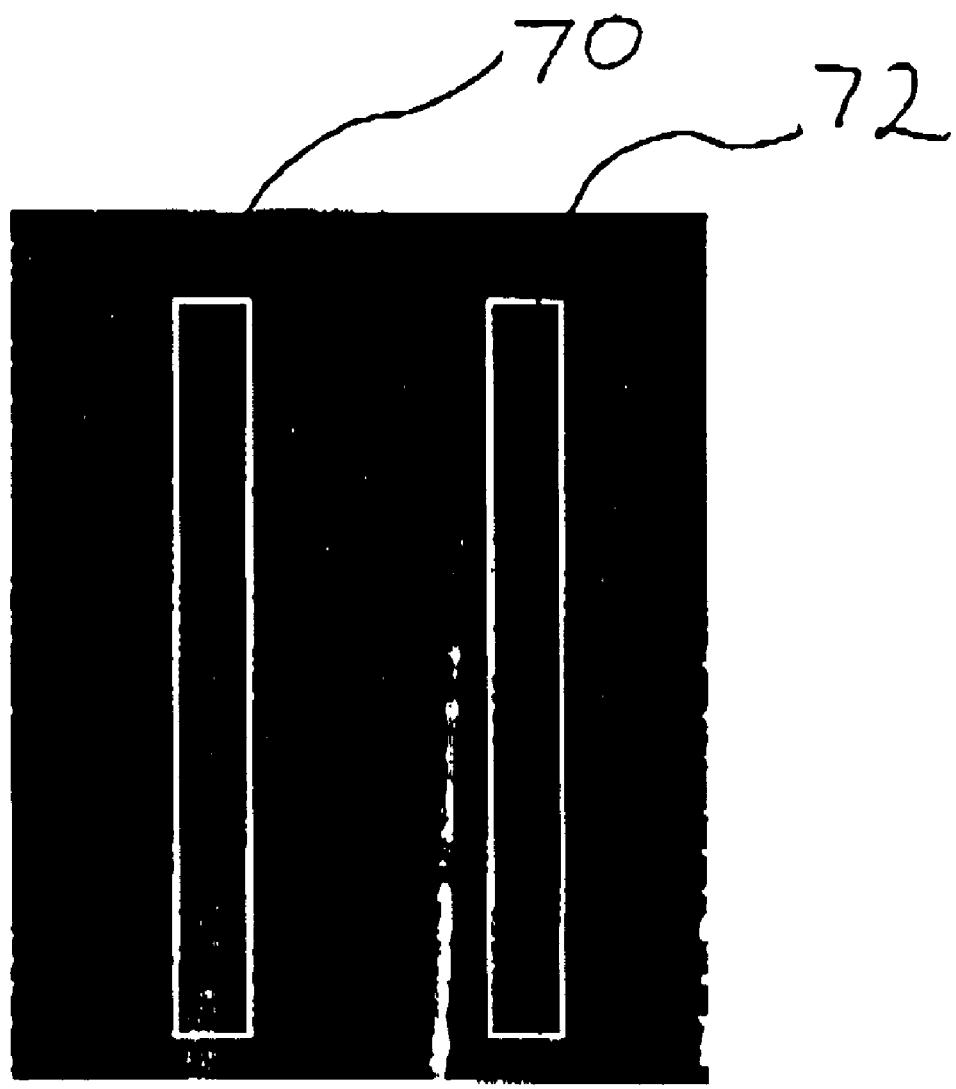
FIG. 4 is an image of the fringes generated by the present invention superimposed with the data reduction windows used to compare stationary and moving fringes.

FIG. 4 is a drawing that represents an example of the fringes generated by the instrument superimposed with the data reduction windows used to compare stationary and moving fringes. The thick photoresist mask is on the left in this image. The light that creates interference fringes in the left hand region 70 comes from the reflection of both polarizations of light reflecting off the resist-SiO2 interface. The fringe phase in this region is a constant since (d1) in FIG. 2 is constant throughout the etching. The window 72 shows the fringes that are due to one polarization of light reflecting off the resist-SiO2 interface interfering with the other polarization reflecting off of the SiO2 water interface. These fringes change their phase as the etching proceeds because d2 changes (see FIG. 2). These fringes march left or right depending on wave front tilts. The fringes shown in FIG. 4 are generated by the present invention in the vicinity of a step formed by the photoresist mask. This step is shown as a line separating the two boxed regions, which is where data is taken during phase measurement. The fringe phase in each box 70 and 72 is measured and these phases are subtracted from one another. In this way the measurement is a relative measurement that is declared zero at the start. The start is noted when the intensity from the SiO2 interface drops due to wetting by water. There is a chance the image as a whole could move and cause the entire set of fringes to move. Such an error biases the thickness (d1) and (d2) in the same way so that there is no net disturbance in the differential depth measurement.

Precision intensity measurements are required for phase stepping interferometers. To improve the signal-to-noise ratio with an 8-bit digitizer, all pixels in the boxed region shown are summed in 7 separate images. The resultant 32 bit intensity measurements are taken four times for each quarter-wave phase stepping of the Wollaston prism. In one embodiment, each step is a 9 micron long lateral movement of the Wollaston prism.

The phase stepping algorithm described in the Schwider et al. reference is used to make phase measurements according to the formula:

$$\tan\left(\Phi + \frac{\pi}{4}\right) = \frac{2(I_1 - I_2)}{I_0 - (I_1 - I_2) + I_3}$$

where $\phi$ is the gross phase of the test sample, and the intensities $I_0$-$I_3$ are taken at the four phase steps 0, $\pi/2$, $\pi$ and $3\pi/2$ respectively.

Experiments with this instrument have proven that local heating by the light source used does not cause a change in etch rate relative to the rest of the part. The fact that room-temperature HF-etching of fused silica is a surface-kinetic controlled process, not influenced by mixing, allows for monitoring only a 100 micron region to be representative of the etch depth experienced by a 40 cm square optic. This has been demonstrated in practice.

Changes and modifications in the specifically described embodiments can be carried out without departing from the scope of the invention, which is intended to be limited by the scope of the appended claims.

I claim:

1. A method for monitoring etch depth and etch rate, comprising:
   providing a common path monolithic interferometer that uses a single shearing interferometer for measurement of phase of a reference image and a signal image;
   providing an optic having a surface to be etched;
   directing light along an optical path through said common path monolithic interferometer to produce said reference image and said signal image;
   measuring the phase of said reference image and said signal image by translating said shearing interferometer in a lateral direction with respect to the optical path so as to phase-shift the light;
   measuring a phase difference between said reference image and said signal image to obtain a starting phase value;
   contacting said surface to be etched with an etchant;
   measuring the phase of said signal image as said optic is being etched by translating said shearing interferometer in a lateral direction with respect to the optical path so as to phase-shift the light and obtain a current phase value of said signal image; and
   measuring a phase difference between said starting phase value and said current phase value to obtain a difference phase value.

2. The method of claim 1, further comprising using said difference phase value to control the etching of said optic.

3. The method of claim 1, wherein said shearing interferometer comprises a Wollaston prism.

4. The method of claim 1, wherein the step of providing a common path monolithic interferometer includes providing a Normarski-Weill microscope.

5. The method of claim 4, wherein said shearing interferometer comprises a Wollaston prism.

6. The method of claim 5, wherein the step of providing a Normarski-Weill microscope includes providing a Hg vapor lamp as an illumination source.

7. The method of claim 6, wherein the step of providing a Normarski-Weill microscope includes providing a baffle in objective optics of said microscope, wherein said baffle eliminates spurious reflections that could add to noise in a measured phase shift of said difference phase value.

8. The method of claim 7, wherein the step of providing a baffle includes placing said baffle near a back surface of said optic, wherein said baffle eliminates ghost reflections due to low reflectance from a nearly index-matched surface of said etchant and said optic.

9. The method of claim 8, wherein said Wollaston prism is connected to a piezoelectric transducer (PZT) which includes an encoder, wherein said PZT moves said Wollaston prism to phase step the light from said Hg vapor lamp.

10. The method of claim 1, wherein the step of measuring the phase of said reference image produces a reference image starting value, said step of measuring the phase of said signal image produces a signal image starting value, and said step of measuring the phase difference between said reference image and said signal image includes subtracting said reference image starting value from said signal image starting value to obtain said starting phase value.

11. The method of claim 1, further comprising monitoring said difference phase value to provide a direct measure of etch depth.

12. The method of claim 1, further comprising applying an irregular dot of resist to said optic to substantially eliminate reflections from a resist-water interface by virtue of a steep contact angle formed and attenuation from absorption of light in the bulk of the resist.

13. An apparatus for monitoring etch depth and etch rate on an optic having a surface to be etched, comprising:
    a common path monolithic interferometer including a shearing interferometer for measuring phase of a reference image and a signal image;
    means for directing light along an optical path through said common path monolithic interferometer to produce said reference image and said signal image;
    means for translating said shearing interferometer in a lateral direction with respect to the optical path so as to phase-shift the light;
    means for measuring the phase of said reference image and said signal image by laterally translating said shearing interferometer;
    means for measuring a phase difference between said reference image and said signal image to obtain a starting phase value;
    means for contacting said surface to be etched with an etchant;
    means for measuring the phase of said signal image by laterally translating said shearing interferometer as said optic is being etched to obtain the current phase value of said signal image; and
    means for measuring a phase difference between said starting phase value and said current phase value to obtain a difference phase value.

14. The apparatus of claim 13, wherein said shearing interferometer comprises a Wollaston prism.

15. The apparatus of claim 13, wherein said common path monolithic interferometer comprises a Normarski-Weill microscope.

16. The apparatus of claim 15, wherein said shearing interferometer comprises a Wollaston prism.

17. The apparatus of claimed 16, wherein said means for translating said Wollaston prism comprise a piezoelectric transducer (PZT) operatively connected to said Wollaston prism, wherein said PZT includes an encoder.

18. The apparatus of claim 15, wherein said Normarski-Weill microscope comprises a Hg vapor lamp as an illumination source.

19. The apparatus of claim 18, wherein said Normarski-Weill microscope includes a baffle in the objective optics of said microscope, wherein said baffle eliminates spurious reflections that could add to noise in the measured phase shift of said difference phase value, wherein said baffle is placed near the back surface of said optic, wherein said baffle eliminates ghost reflections due to the low reflectance from the nearly index-matched surface of said etchant and said optic.

20. The apparatus of claim 13, further comprising an irregular dot of resist applied to said optic to substantially eliminate reflections from a resist-water interface by virtue of a steep contact angle formed and attenuation from absorption of light in the bulk of the resist.

* * * * *